W. J. MILLER.
GLASS MOLDING MACHINE.
APPLICATION FILED FEB. 23, 1909.

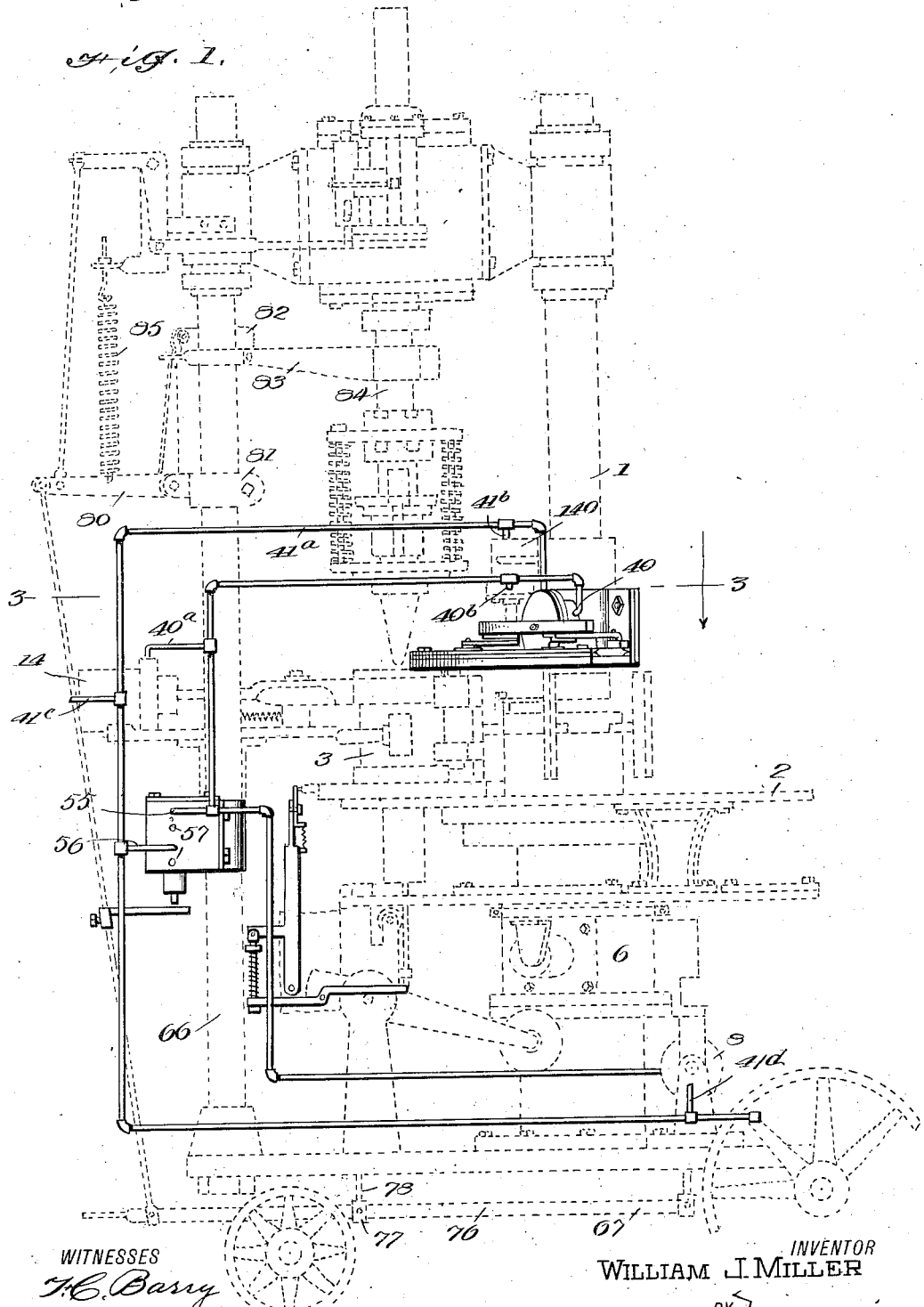

937,626.

Patented Oct. 19, 1909.
2 SHEETS—SHEET 2.

WITNESSES
F. E. Barry
C. E. Train

INVENTOR
WILLIAM J. MILLER
BY Munn & Co.
ATTORNEYS

UNITED STATES PATENT OFFICE.

WILLIAM J. MILLER, OF COFFEYVILLE, KANSAS.

GLASS-MOLDING MACHINE.

937,626.

Specification of Letters Patent.   Patented Oct. 19, 1909.

Application filed February 23, 1909.   Serial No. 479,517.

*To all whom it may concern:*

Be it known that I, WILLIAM J. MILLER, a citizen of the United States, and a resident of Coffeyville, in the county of Montgomery and State of Kansas, have invented certain new and useful Improvements in Glass-Molding Machines, of which the following is a specification.

My invention is an improvement in glass molding machines, and consists in certain novel constructions and combinations of parts hereinafter described and claimed.

The object of the invention is to provide a valve for operating all of the different mechanisms in semi-automatic machines of the type shown in Patent No. 787,050, of April 11, 1905.

Figure 3:
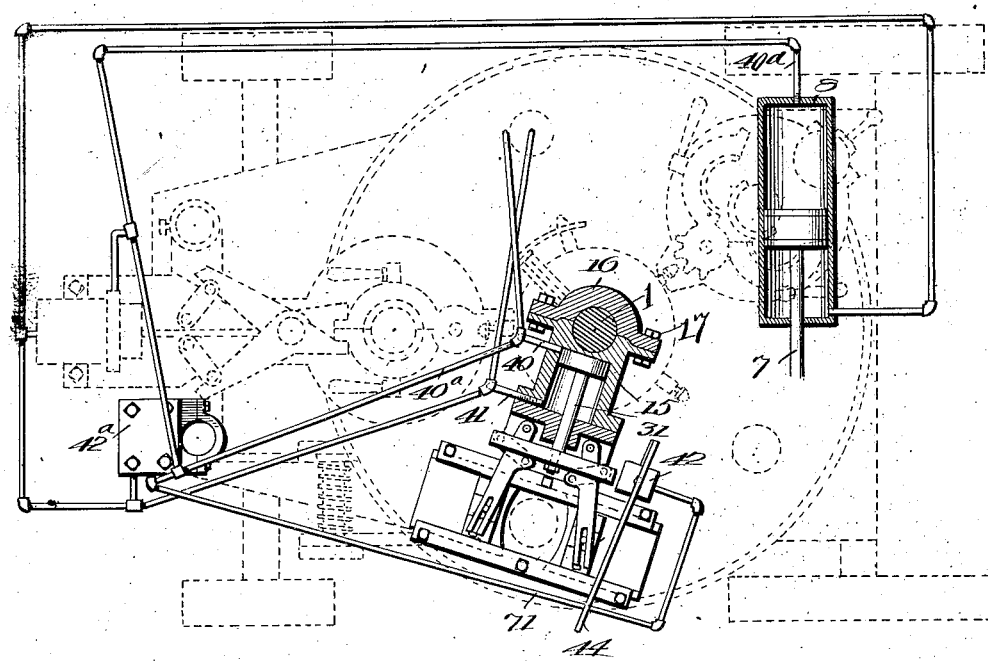
Figure 2:
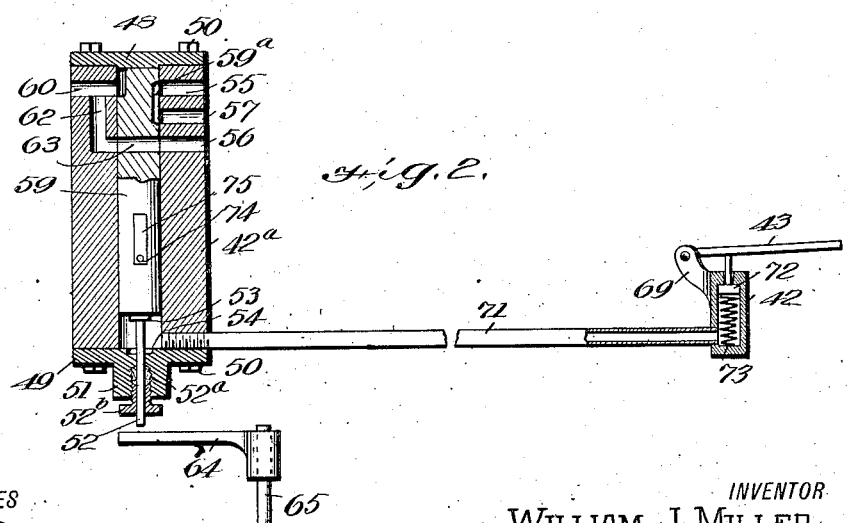

Referring to the drawings forming a part hereof—Figure 1 is a side view of a portion of a molding machine provided with the improvement, the novel features being shown in full lines; Fig. 2 is a longitudinal section through the said valve, and Fig. 3 is a section on the line 3—3 of Fig. 1.

The glass blowing machine consists of a column or spindle 1 on which is rotatably mounted a table 2, which carries the molds 3. An intermittent rotary movement is imparted to the table by means of any suitable mechanism connecting a sleeve 6 loosely encircling the spindle 1 below the table 2, with the piston rod 7 of an air cylinder 8.

In the construction shown, the table 2 is provided with five blow molds, one for charging, one for pressing, one for blowing, one for discharging, and one which is permitted to cool before charging, so that all of the operations above mentioned can take place simultaneously. It will be understood that each intermittent movement of the table carries a mold from one station to the next. At the charging position is arranged a pair of shears, which are operated by the piston 31 of a cylinder 15, which is provided with an integral split bearing 16, encircling the spindle 1 before mentioned, the sections of the split bearing being secured together by bolts 17, the arrangement being such that when fluid is admitted to one end of the cylinder the shears are moved toward each other, and when admitted to the opposite end they will move from each other.

Each end of the cylinder is provided with a port 40, 41, and the ports are controlled by a valve 42, which may be of any suitable construction, and is operated by means of a lever 43, whose free end 44 extends to a point convenient for engagement by the gatherer as he places the charge in the mold. As shown it is in position for engagement by the punty.

The valve 42 before mentioned operates a valve plug in a casing or cylinder $42^a$, having removable heads 48 and 49, secured to the cylinder by screws 50. The lower head 49 is provided with an extended bearing or hub 51 through which slides a stem 52, and a packing $52^a$ is arranged in the bearing, the packing being secured in place by a packing nut $52^b$. The stem is provided with a head 53 for engaging the valve and the head 49 of the cylinder is recessed as at 54 to receive the head 53, so that when the stem is in its lowermost position the surface of the head is flush with the inner surface of the cylinder head.

The valve casing is provided with ports 55 and 56, and with an exhaust opening 57. The port 40 of the cylinder 15 connects with the port 55 of the casing by a pipe $40^a$, from which branches $40^b$, $40^c$ and $40^d$ lead to the cylinders 140, 141 and 8 respectively, the cylinder 140 being connected with the blowing apparatus, the cylinder 141 with the mold clamping apparatus, and the cylinder 8 with the table rotating mechanism. The port 41 of the cylinder 15 is connected by a pipe $41^a$ with the port 56 of the valve casing, and by branch pipes $41^b$, $41^c$ and $41^d$ with the cylinders 140, 141 and 8 respectively.

The valve plug 59 is provided with a groove $59^a$ which is adapted to connect the ports 55 or 56 with the exhaust port 57, depending upon the position of the plug, and the casing is provided with an inlet port 60 which is adapted to be connected with the port 56 by means of openings 62 and 63 in the casing and plug respectively, and with the port 55 when the plug is in lowered position. The stem 52 before mentioned is operated by means of an arm 64 adjustably secured on a rod or link 65 to be presently described, and the valve casing is secured to a standard 66 supported by the base 67 of the machine, to which base the spindle 1 is also connected, by means of a split bearing 68.

The lever 43 before mentioned is pivoted to a bracket 69 extending from the valve casing 42, which is connected with the valve casing $42^a$ by a pipe 71 extending from the lower part thereof. The valve casing 42 is provided with an opening forming an outlet for the valve casing 42ª, but normally closed by a loose fitting valve 72 whose stem projects through the casing and is in position for engagement by the lever 43, the valve being normally supported in closed position by the spring 73. The valve plug 59 is guided in its movement by a pin 74 arranged transversely of the valve casing and engaging a slot 75 in the plug.

It will be evident from the description, that when the lever 43 is depressed to open the valve 72, the plug 59 will drop, thus placing the inlet port of the valve casing in communication with the port 55, and through the pipe 40ª and its branches with the cylinders 15, 140, 141 and 8, thus operating the shears, raising the blow head, releasing the mold clamping apparatus, and turning the table. At the same time the port 56 is in communication with the exhaust, thus exhausting the pipe 41ª and its branches. When the link 65 moves upward, the valve 59 will be lifted, thus admitting fluid to the opposite ends of the cylinders, whereby to open the shears, to lower the blow head, clamp the mold, and retract the table turning mechanism.

The link 65 before mentioned, has its lower end connected with the lever 76 pivoted as at 77 beneath the table, the central portion of the lever being connected with a rod 78 whose upper end engages one of a series of openings in the lower table, whereby to lock the table at the end of each intermittent movement. The upper end of the link is connected to one arm of an elbow lever 80, pivoted to a sleeve 81 on the standard 66, and the other arm of the elbow lever is engaged by a trip 82 on an arm 83 secured to the plunger stem 84. The trip 82 is mounted to yield on the downward movement of the arm and on the upward movement it operates the elbow lever to unlock the table, the link moving downward. A spring 85 is connected with the first named arm of the elbow lever for returning the lever to its original position, and it is upon the upward movement of the link that the valve plug 59 is lifted thus operating the cylinders as before mentioned.

The valve plug is retained in its upper position, by means of the fluid pressure which leaks past the plug and fills the space therebelow, the plug being not a perfect fit in the casing. This pressure and the friction of the plug against the casing prevents its falling of its own weight. However, when the air is exhausted at 72 the pressure is then greater above than below and it is forced to the bottom of the casing.

The valve plug 59 is pushed up by the upward movement of the link, through the medium of the small piston rod which passes through the lower head of the valve casing, and is held up by the link until the table is again unlocked and the link depressed. By this time enough air has escaped past the valve plug to the lower end of the casing to fill the space below the plug and the pipe leading to the small valve 42, the said valve being at this time closed at the same air pressure as is above the plug. The friction of the plug against the casing holds it suspended until the air below the plug is allowed to escape the valve 42, the said air escaping faster than it can leak past the plug thus lowering the pressure beneath the plug and since there is full pressure above the plug it is forced to the bottom of the casing.

I claim:

1. In a machine of the class described, the combination with a plurality of fluid operated cylinders for the purpose set forth, of a valve casing, provided upon one side with an inlet and upon the other with an exhaust, and with a port upon each side of the exhaust, a connection between one of said ports and one end of each of said cylinders, a connection between the other port and the other end of each of said cylinders, a plug in the casing provided with means for connecting the inlet with one of said ports when the valve is in uppermost position and with the other when in lowermost position, and with means for simultaneously connecting the other of the ports with the exhaust, a rod movable through the casing, and engaging the lower end of the plug, a locking device for the table, means connected with the said device for engaging the rod to move the plug upward when the table is locked, said casing having an exhaust below the plug, a valve remote from the casing for controlling the exhaust, and a lever controlling the valve.

2. In a machine of the class described, the combination with a plurality of fluid operated cylinders for the purpose set forth, of a valve casing, provided upon one side with an inlet and upon the other with an exhaust and with a port upon each side of the exhaust, a connection between one of said ports, and one end of each of said cylinders, a connection between the other port and the other end of each of said cylinders, a plug in the casing provided with means for connecting the inlet with one of said ports when the valve is in uppermost position and with the other when in lowermost position, and with means for simultaneously connecting the other of the ports with the exhaust, a locking device for the table, means connected with the said device for moving the plug upward when the table is locked, said casing having an exhaust below the plug, a valve remote from the casing for controlling the exhaust and a lever for operating the valve.

3. In a machine of the class described, the combination with a plurality of fluid operated cylinders for the purpose set forth, of a valve casing, provided with an inlet and with an exhaust, and with a port upon each side of the exhaust, a connection between one of said ports and one end of each of said cylinders, a connection between the other port and the other end of each of said cylinders, a plug in the casing provided with means for connecting the inlet with one of said ports when the valve is in uppermost position and with the other when in lowermost position and with means for simultaneously connecting the other of the ports with the exhaust, a locking device for the table, means connected with the said device for moving the plug upward when the table is locked, said casing having an exhaust below the plug, and a valve remote from the casing for controlling the exhaust.

4. In a machine of the class described, the combination with a plurality of fluid operated cylinders, for the purpose set forth, of a valve casing, provided with an inlet and with an exhaust and with a port upon each side of the exhaust, a connection between one of said ports, and one end of each of said cylinders, a connection between the other port and the other end of each of said cylinders, a plug in the casing provided with means for connecting the inlet with one of said ports when the valve is in uppermost position and with the other when in lowermost position, and with means for simultaneously connecting the other of the ports with the exhaust, said casing having an exhaust below the plug, and a valve for controlling said exhaust.

5. In a machine of the class described, the combination with a plurality of fluid operated cylinders for the purpose set forth, of a valve casing, provided with an inlet and with an exhaust and with a port upon each side of the exhaust, a connection between one of said ports, and one end of each of said cylinders, a connection between the other port and the other end of each of said cylinders, a plug in the casing provided with means for connecting the inlet with one of said ports when the valve is in uppermost position and with the other when in lowermost position, and with means for simultaneously connecting the other of the ports with the exhaust, means for locking the table and means in connection with said means for moving the valve upward when the table is locked, the casing having an exhaust valve below the plug.

6. In a machine of the class described, the combination with a plurality of fluid operated cylinders for the purpose set forth, of a valve casing, provided with an inlet and with an exhaust and with a plurality of ports, a connection between one of said ports, and one end of each of said cylinders, a connection between the other port and the other end of each of said cylinders, a plug in the casing provided with means for connecting the inlet with one of said ports when the valve is in uppermost position and with the other when in lowermost position, and with means for simultaneously connecting the other of the ports with the exhaust, and means for controlling the movement of the plug.

WILLIAM J. MILLER.

Witnesses:
 ANNA K. SASS,
 MERCEDES SASS.